United States Patent [19]
Dixson et al.

[11] 3,870,495
[45] Mar. 11, 1975

[54] PARTICULATE AND/OR GAS FILTERS AND ASSOCIATED FILTERING EQUIPMENT TO PURIFY AIR TO BE BREATHED BY PERSONS IN VEHICLES AND/OR BUILDINGS, AND MANUFACTURE AND INSTALLATION OF THESE FILTERS

[75] Inventors: Bruce E. Dixson, Grand Junction; Marcus I. Hoffman, III, Palisade; Milton A. Walls, Grand Junction, all of Colo.

[73] Assignee: Air Purification Systems, Inc., Grand Junction, Colo.

[22] Filed: Dec. 22, 1972

[21] Appl. No.: 317,829

[52] U.S. Cl............... 55/489, 55/497, 55/521, 55/524, 98/2.11, 98/2.17
[51] Int. Cl............................................ B01d 50/00
[58] Field of Search............ 55/309, 310, 311, 312, 55/315, 387, 467, 489, 490, 498, 502, 521, DIG. 5, DIG. 25; 98/2.06, 2.07, 2.1, 2.11, 2.16, 2.17, 2.19

[56] References Cited
UNITED STATES PATENTS

| | | | |
|---|---|---|---|
| 2,634,671 | 4/1953 | Puldokas | 98/2.17 |
| 2,685,244 | 8/1954 | Wahlberg et al. | 98/2.17 |
| 2,717,148 | 9/1955 | Hall | 98/2.11 |
| 2,897,971 | 10/1963 | Gewiss | 55/521 |
| 3,106,528 | | Burks | 55/498 |
| 3,199,275 | 8/1965 | Fesco | 55/521 |
| 3,279,616 | 10/1966 | Bourdale | 55/502 |
| 3,417,551 | 12/1968 | Bonell | 55/521 |
| 3,631,582 | 1/1972 | Lucas | 55/521 |
| 3,692,184 | 9/1972 | Miller et al. | 55/498 |
| 3,719,135 | 3/1973 | Breitschwerdt et al. | 98/2.07 |

*Primary Examiner*—C. W. Lanham
*Assistant Examiner*—James R. Duzan
*Attorney, Agent, or Firm*—Roy E. Mattern, Jr.

[57] ABSTRACT

For particulate capture, random fibers which are generally non woven laid fibers are preferably used in the filters. Two or more laminations of the random fiber filtering materials are used and then normal resulting mismatched arrangement of non woven laid fibers eliminates any probable alignment of oversize filter material openings resulting from production variances in specified filter size openings. For gas filtering, inclusive of odor capture, activated carbon, i.e. charcoal, in loose granular form, and adhered particles is used with the random non woven laid fiber particulate filtering materials, which generally are non woven paper fibers. Preferably, both functions of particulate filtering and gas filtering are performed by each filter.

22 Claims, 27 Drawing Figures

PATENTED MAR 11 1975 3,870,495
SHEET 1 OF 5
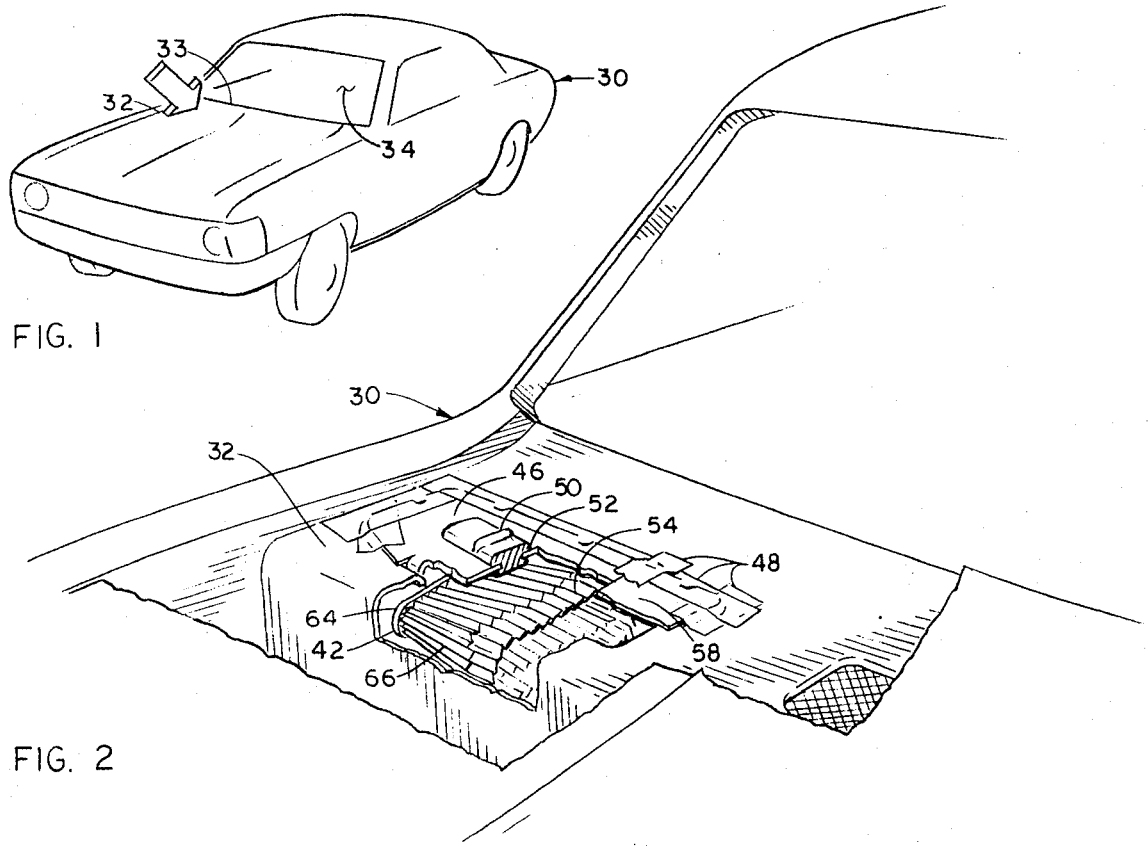
FIG. 1
FIG. 2
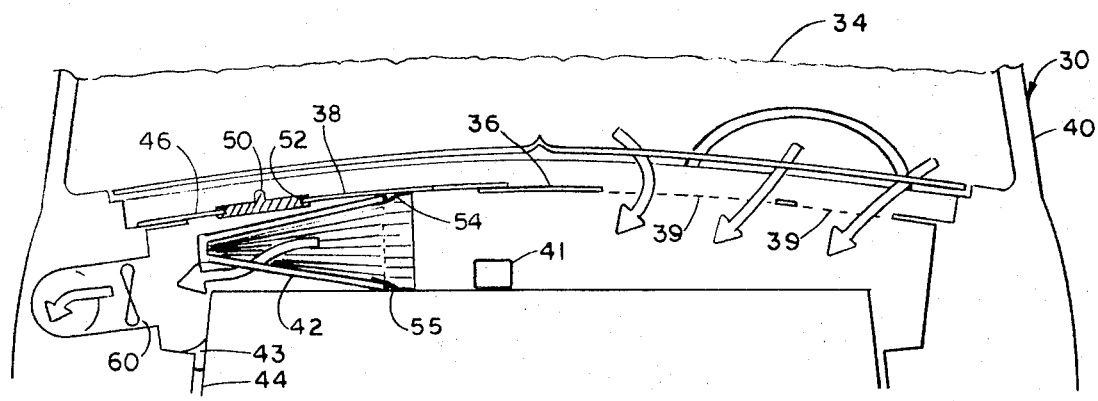
FIG. 3
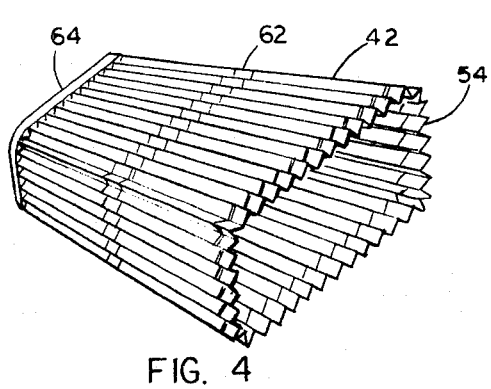
FIG. 4
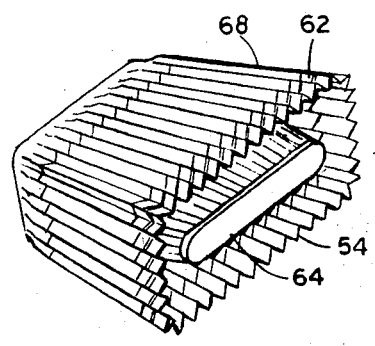
FIG. 5

PATENTED MAR 11 1975 3,870,495
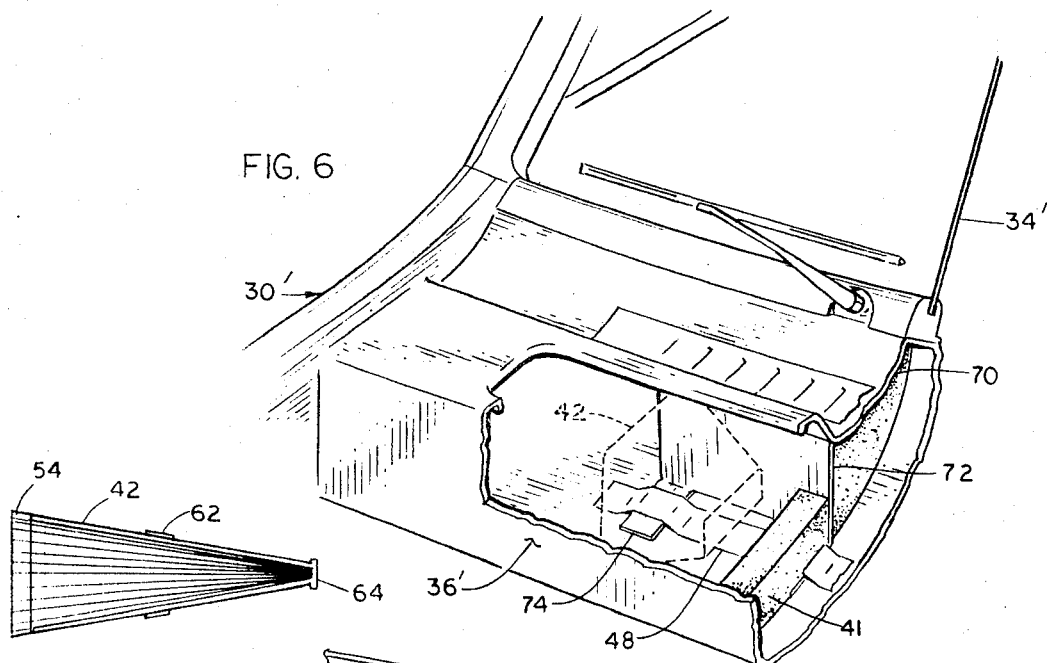
FIG. 6
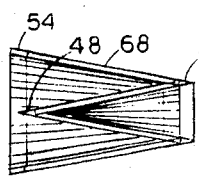
FIG. 7
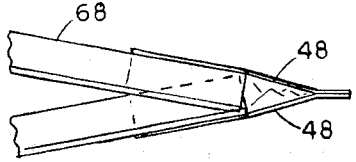
FIG. 8
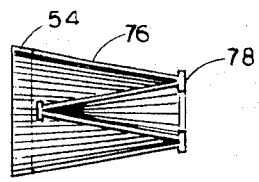
FIG. 9
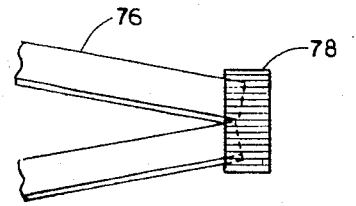
FIG. 10
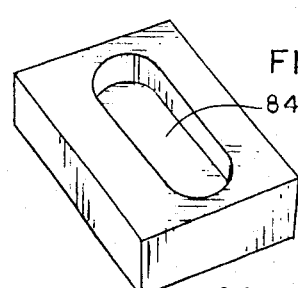
FIG. 13
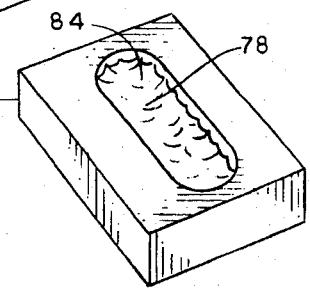
FIG. 14
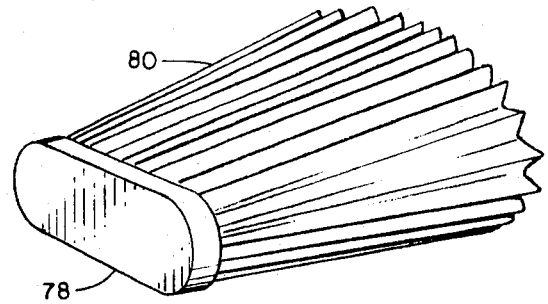
FIG. 11  FIG. 12
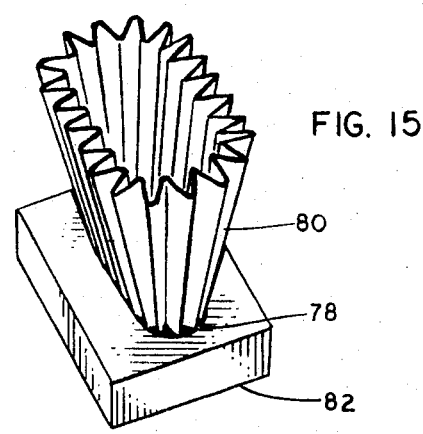
FIG. 15
FIG. 16

PARTICULATE AND/OR GAS FILTERS AND ASSOCIATED FILTERING EQUIPMENT TO PURIFY AIR TO BE BREATHED BY PERSONS IN VEHICLES AND/OR BUILDINGS, AND MANUFACTURE AND INSTALLATION OF THESE FILTERS

BACKGROUND OF THE INVENTION

Although particle and/or gas filtering media are well known their adaptation to confined air intake and circulating plenums and ducts of vehicles and buildings has generally not been undertaken. This is especially so, in reference to vehicles, whereby a filtering unit has not been made available to filter all incoming air, which would be very effective over a sufficient useful operating life, without causing any burdensome pressure drop at any operational time, and without requiring extensive structural alterations of production vehicles, and without requiring a large inventory of filters in many sizes and shapes.

Yet such a filtering unit is presently needed during dust storms, and during sustained periods of smog for all persons, and during continuous periods for persons who otherwise will suffer from breathing in particulates, pollens and gases. Until such time as the release of man made harmful pollutants into the atmosphere is under better control, filtering units will be needed. Even then, there still will be a requirement for odor free, cleaned air to be supplied for the enjoyable comfort of all passengers of vehicles and of all occupants of buildings.

Therefore, to presently provide particulate and/or gas filtering equipment to purify all air to be breathed by persons in vehicles and buildings and to provide for the convenient and economical manufacture and installation thereof: the filters or filter cartridges; related accessory or system equipment; manufacture and assembly facilities and methods; and the installation accessories and methods; are all provided within the scope of this invention. The filter cartridges in the related system are effective in the removal or conversion of most unwanted pollutants, inclusive of but not limited to nitric oxide, nitrogen dioxide, sulfur dioxide, hydrocarbons, dust, pollens, other solid particulates, and a limited amount of carbon monoxide, thereby providing a healthful and pleasant ambient breathable atmospheric interior environment in vehicles and dwellings.

SUMMARY OF INVENTION

To provide cleaner and less odorous atmospheric environmental air inside vehicles and dwellings to be breathed by all persons and especially those seriously affected by impure air, pollens, and pollutants, with respect to all incoming outside air, both gases and particles, are filtered out or converted preventing impure air from reaching passenger and/or living spaces. The principal filtering component preferably in a cartridge form, is made of non woven laid fibers of wood, paper, hemp or like fibers inclusive of synthetic inorganic fibers. For gas filtering and conversion, activated carbon is mixed with and/or bonded to the partial filtering non woven laid fibers making them very effective for filtering particles and gases and for conversion of harmful gases into non harmful gases by utilizing their screening and adsorption functions. To block isolated escape passageways resulting from original filter production imperfections of the filtering components, two or more layers of filter materials are secured together to avoid such otherwise escape passageways in single layers, thereby resulting in substantially complete filtering without creating any intolerable pressure drops as the incoming outside air passes through the overall filter cartridge having two or more layers or laminations and accessory equipment of the filter system, and without requiring a more expensive filter material manufacturing process.

To create a greater expanse of filtering material through which the incoming outside air must pass, both to insure complete filtering for longer operating periods and such filtering occurring within pressure drop tolerances, conical and near conical like configurations of filters are provided using single and/or multiple combined cones. Moreover, to permit their installations in confined spaces and often their entry through restricted inspection and/or installation access openings, the conical filters are made in pleated configurations. The degree of compactness of the pleats is varied upon entry of each filter and its subsequent rearrangement to complete its positioning, so it will thereafter filter all incoming outside air before it reaches the interior of a vehicle passenger compartment or a living space of a dwelling.

Each conical shaped filter cartridge is conformed, both as to size and shape, to the interior of a plenum or duct and secured with adhesive backed foil, thereby eliminating any possible need for framework and/or other fastening means which would otherwise reduce the cross sectional area of the plenum or duct and thereby obstruct the flow in incoming outside air.

In addition, conveniently arranged manufacturing apparatus is provided: preferably, to first adhesively secure together in selected places two layers of filter material; then to place reinforcing or stiffening formable, spaced, bands on the filtering material, in some of the same selected places they have been secured together using adhesives, and thereafter also to place adhesively backed foil tapes on the ends of filtering materials for their subsequent securement, protective paper covering adhesive areas to be used later. Then after such conveyor line placement of these bands and tapes, the composite sub assembly of filter components, well laminated together to avoid by passes, is directed between pleating rollers or is directed to interacting pleating bars and then directed to cutting blades to create multiple pieces, later formed into specific sized conformable filter cartridges. They are so conformable, both as to size and shape, possibly only three sizes will need to be stocked for vehicle installations.

In all installations and particularly in vehicle installations, to create maximum filtering structures through which incoming outside air will pass while guided in a small cross section plenum or duct, the pleated and stiffened filter cartridge is conically formed in a single or multiple cone configuration using adhesives, optionally using foil tape with adhesive backing, or using centrally positioned closed cell sponge rubber portions, and/or using plastic elastomers keeping the converging end portions of the filters slightly spaced apart and yet secured.

Where necessary, cross sectionally placed blocking materials, called facility plugs, are positioned to avoid incoming outside air from going around a filter cartridge which, although quite conformable, may not be conveniently expanded into quite an irregular shaped cross section of a duct or plenum chamber. Also one or more air by passes are installed to be opened upon excessive pressure drops occurring as a filter cartridge, for example, may be subjected to icing conditions or extremely severe dust loading conditions. Moreover, as necessary, the flow of rainwater toward a filter is blocked by one or more dams, causing the water, for example in a vehicle cowl plenum chamber, to flow down through a drain located on a vehicle side opposite to the side where the filter cartridge is installed. Any drains located on the filter side are filled with material to restrict or reduce incoming outside air from entering behind the filter cartridge. However, the filling material in the drains, such as open cell foam rubber serving as an air restricting plug will permit collected water to eventually drain out, thereby preventing rusting of interior component parts of a vehicle by the presence of any standing collected water.

Therefore in many vehicles in their plenums or other air collecting and/or guiding structures, and in many dwellings also in their air collecting and/or guiding structures, this particulate and/or gas filtering equipment centering on the unique conformable, compactable and then expandable filter cartridge, preferably arranged in a conical-like configuration, is conveniently installed, serviced and replaced. The installed system of filtering equipment effectively and thoroughly filters all incoming outside air, throughout reasonably long operating periods between servicing, providing clean non-harmful air to the respective passengers of vehicles and/or the occupants of buildings, often eliminating strong odors from the incoming outside air.

DESCRIPTION OF DRAWINGS

Preferred embodiments of the filtering system assembly or equipment, the various filters per se, and the filter manufacturing equipment are illustrated in the accompanying drawings wherein:

FIG. 1 is a perspective view of a vehicle with a large arrow indicating a preferred general location for an installed filtering system assembly or equipment;

FIG. 2 is a partial perspective view of the vehicle with portions of its cowl, hood, and plenum removed to illustrate the installation of a filtering system assembly, inclusive of the pleated filter cartridge, two plenum cover plates, adhesive tapes to secure cover plates in place and a by-pass plug, and also showing a portion of the unaltered incoming outside air screened entry on the opposite side of the cowling;

FIG. 3 is a partial cross sectional view taken through the cowling, plenum and body portions of the vehicle showing, with directional arrows, the flow of incoming outside air passing by the cowling adjacent the windshield, then downwardly into the screened entry, then transversely over the water dam and into and through the filter cartridge, and thereafter beyond the filter cartridge through the fan and into the distribution duct leading to the passenger compartment air conditioning accessories and related outlets, and also showing an air by-pass plug for opening in an emergency when the filter might be iced over, and showing a plug inserted in water drains located on the filter side of the plenum to restrict air from coming up through the drains while still allowing water to drain out;

FIG. 4 is a perspective view of a pleated filter cartridge in its conformable single cone form ready for compacting, then insertion and thereafter expansion into a plenum or duct to completely filter all incoming outside air, and illustrating the arrangement of a closed cell foam rubber end, stiffening bands for shaping, and an end adhesive tape for securing the filter to the surrounding plenum and plenum cover structures;

FIG. 5 is a perspective view of a pleated filter cartridge in its conformable double cone form ready for compacting, then insertion and thereafter expansion into a plenum or duct to completely filter all incoming outside air, and illustrating the arrangement of a closed cell foam rubber central portion, stiffening bands for shaping, and adhesive tape both for assembly of the cones and for securing the filter to the surrounding plenum and plenum cover structures;

FIG. 6 is a partial perspective view of another vehicle with portions of its cowl, hood, and plenum broken away to illustrate the installation of a filtering system assembly, inclusive of the pleated filter cartridge location shown in dotted lines, and indicating how a filter cartridge may be effectively reversed, end for end, and showing the positioning of a water dam preventing rain water coming in with outside air from reaching the filter cartridge, and illustrating the positioning of an air and water blocking structure, called a facility plug, installed with a support and adhesive tape in the irregular cross sectional portion of the plenum chamber into which the filter cartridge is not conveniently expanded;

FIG. 7 is a cross sectional view of a filter cartridge having a conical-like form for placement in a plenum or a duct, indicating the positioning of its end located adhesive backed foil tape, its stiffening bands, and its closed cell foam rubber and which is adhered in place with adhesives;

FIG. 8 is an enlarged partial cross sectional view of the closed cell foam rubber end on the conical filter cartridge shown in FIG. 7;

FIG. 9 is a cross sectional view of a filter cartridge having a multiple conical like form for placement in a plenum or a duct, indicating the positioning of two cone portions, its end located adhesive tape, its stiffening bands, and the joining of the two cones involving the interfitting of pleats and the placement of edge surrounding holding tapes;

FIG. 10 is an enlarged partial cross sectional view of the interfitting of pleats and the placement of edge surrounding holding tapes which extend beyond for their own direct attachment to each other on the conical filter cartridge shown in FIG. 9;

FIG. 11 is a cross sectional view of a filter cartridge having a multiple conical like form for placement in a plenum or a duct, indicating the positioning of two cone portions, its end located adhesive backed foil tape, its stiffening bands, and its molded in place plastisol plastic central portion, and outer portions thereby joining the two cones together;

FIG. 12 is an enlarged partial cross sectional view showing the filter pleats of the outside and inside cones molded in place with plastisol plastic on the filter cartridge shown in FIG. 11;

FIG. 13 is a perspective view of a mold to receive cold liquid plastic materials, such as plastisol plastic which is subsequently heat cured upon heating the mold;

FIG. 14 is a perspective view of the mold shown in FIG. 13, partially filled with cold liquid plastic materials before heating;

FIG. 15 is a perspective view of the mold shown in FIGS. 13 and 14 with a filter cartridge being made as the ends of the filtering materials are placed into the cold liquid plastic materials before the subsequent heating curing is undertaken;

FIG. 16 is a perspective view of the filter cartridge made by using the mold shown in FIGS. 13, 14, and 15;

DESCRIPTION OF PREFERRED EMBODIMENTS

Places of Installation

Figure 17:
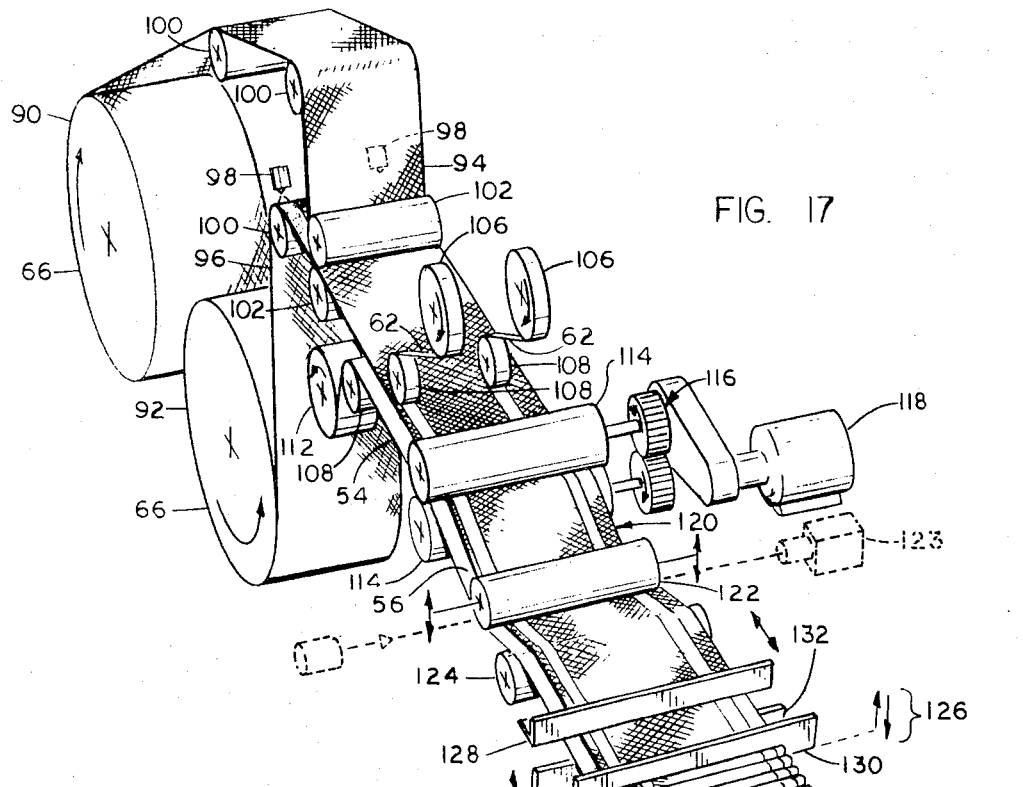
FIG. 17 is a partial perspective and schematic view indicating how particulate and/or gas filters are manufactured in two laminations or layers using many machine operations, commencing with two large rolls of non woven fibers optionally inclusive of charcoal portions, which are unrolled and at selection bead line locations furnished with adhesives forced out of orifices for their joining along the same limited areas to soon thereafter receive reinforcing foil tapes adhesively secured to the top lamination, and to also receive the filter cartridge's entry end securement adhesively covered foil tapes secured to the then bottom of the bottom lamination of filter material, these adhesively covered foil tapes extending beyond and remaining partially covered with protective release paper until the filter cartridge is installed, and further showing pleating and cutting mechanisms to prepare the pleated laminations of the two layers of filter material which are subsequently additionally formed into various filter cartridge embodiments such as the single and double cone filter cartridges shown in FIGS. 19 and 20.

The particulate and/or gas filter cartridge described and illustrated with all, some, or no accessories of a filtering system, is installed wherever air must be purified or should be purified to withdraw particulates and pollens, and/or to eliminate or convert harmful and unpleasant gases. In its starting conical formation, the filter cartridge is particularly suited for placement in plenums and ducts where the cross-sectional air flow area is limited. A filter material having random laid fibers arranged to create pore sizes small enough to be effective in filtering out all the harmful particles, if positioned directly across the cross section of most plenums or ducts, would restrict the flow sufficiently so the pressure drop through the filter would be critical. Therefore, the incoming outside air must be able to flow through a greater area of this selected filter material. The conical configuration of the filter material provides such greater area in a very effective way without unnecessarily restricting the quantity of flow of the incoming outside air, throughout a reasonable operating time of the filtering system.

Moreover, the conformable conical filter cartridge is used in many places where the access to the installation location is very limited. The filter cartridge, with or without charcoal is made to be compacted for insertion through restrictive openings. Thereafter, it is readily expanded back toward its original conical shape to fit the shape of a particular duct in which it is installed. In at least one cross-sectional area location, each filter cartridge is expanded to fit the plenum or duct and thereby completely capture all incoming outside air for filtering. In some extremely irregular cross-sectional locations, a facility plug may be used in small irregular areas adjacent the conical shaped filter cartridge to completely insure the passage of all incoming outside air through the filter cartridge.

The conical or conical like conformable particulate and/or gas filter cartridge is particularly suited for installations in an air filtering system of a vehicle. The filtering system is installed without any reforming of the factory structure of the vehicle, being arranged and then temporarily sealed into one half of the incoming air plenum, and including a water dam, a facility plug as necessary, any filter but preferably the conical filter cartridge, and plugs in the plenum water drains to restrict air inflow but allow water to drain out. The conformable filter cartridge is so readily adapted for installation in many vehicles, only three sizes will probably be stocked, yet all vehicle filtering systems may be serviced using any one of the three. Also this conical conformable filter cartridge is suited for installations in air filtering systems of homes, offices, stores, hospitals, etc., in which people must spend considerable time without any extensive modifications of air heating or cooling systems. The conical filter cartridge may be installed to receive all the return air from the system within the building and also the new outside incoming air for filtering before further reconditioning and distribution throughout the building. Also, as a second stage of filtering, the conical filter cartridge may be installed in a major return duct leading back to all the rooms of a building. Or the conical filter cartridges may be installed in selected branches of the return duct system, for example, when a person needs very effective filtering in particular rooms of a building.

General Data and Design Considerations

In reference to urban areas and particularly to the operation of vehicles in such areas, the pollutant concentration data selected for filter cartridge designs, follows:

Assumption of Pollutant Concentrations for Cartridge Design

| Adsorbed Pollutants | P.P.M. | Micrograms per Cubic Meter |
|---|---|---|
| Nitrogen Dioxide | 0.035 | 66 |
| Sulfur Dioxide | 0.059 | 157 |
| Total Hydrocarbons* | 0.120 | 80 |
| Photochemical Oxidents (Ozone) | 0.030 | 59 |
| Misc. Other Pollutants | | 38 |
| TOTAL | | 400 |
| Catalytically Converted Pollutants | | |
| Carbon Monoxide | 7.000 | 8,020 |

*Total hydrocarbons is assumed as ½ of the national primary standard, measured and corrected for methane, for maximum 3-hour concentration. All other assumed concentrations are yearly averages for six cities.

Assumption of Total Suspended Particulates for Cartridge Design

Yearly average urban ≅ 100 micrograms per cubic meter

In regard to one selected activated carbon filtering media, a whetlerite activated carbon derived from coconut husks is bonded to a matrix of hemp, synthetic and inorganic fibers wherein the bonding materials do not interfere with the adsorption qualities of the activated carbon.

In reference to selected filter media the typical properties of two are indicated as follows:

| Filter Property | One Media | Another Media |
|---|---|---|
| Basic Weight | 90 No./3000 ft$^2$ | 180 No./3000 ft$^2$ |
| Gauge | 28 mils | 60 mils |
| Porosity | 175 cfm | 85 cfm |
| Dry Tensile Strength | | |
| Machine Direction | 3500 gm/in | |
| Cross Direction | 3000 gm/in | |
| Wet Tensile Strength | | |
| Machine Direction | 250 gm/in | |
| Cross Direction | 230 gm/in | |
| Gurley Stiffness | | |
| Machine Direction | 1600 mg | |
| Cross Direction | 1500 mg | |
| Carbon Content | 60% | |

With respect to adhesives used in joining filter portions together and to foam rubber central portions, adhesives are used which are formulated with non-inflamable solvents, dry rapidly, after setting are waterproof, and withstand high and low temperatures. Such adhesives are available from the Borden Company. Also adhesive tapes without and preferably with removable parting paper strips are used in securing filter cartridge portions together. Then, after removal of parting paper, the filter cartridge portions are secured to the structures of plenums, cover plates, and ducts, eliminating any use of fastening equipment which might otherwise reduce the cross-sectional area of the plenum or duct.

In designing conical pleated filters preferably designated as cartridges or filter cartridges, and in reference to vehicle plenum installations, the design operating conditions selected were:

100 c.f.m. average air flow, or 2.83 m$^3$/min, occurring during 5,000 miles of travel, or 125 operating hours of the vehicle.

In respect to the anticipated accumulation weight of the collected filtered out pollutants in a vehicle filter:

125 hours at 100 c.f.m. = 750,000 ft$^3$ = 21,225 m$^3$ 21,225 m$^3$ x .0004 g/m$^3$ ≅ 8.5 g A filter cartridge for a vehicle to comply with these design objectives has a:

Filter media width - 8.5 inches

Length - 56 1/4 inch (74 pleats + 1 lapped ½ pleat)

Effective Area - 406 in.$^2$ = 2.72 ft$^2$

Media Weight - 180 lbs/3000 ft$^2$ = .06 lbs/ft$^2$ 2.72 ft$^2$ x .06 = 0.16 lb total Carbon Content - 60% by weight Total Carbon - 0.16 lb x 0.6 = 0.09 lbs = 40.9 g The joining together of end portions of the conical filters is preferably undertaken by a molding process wherein a heat cured polyurethane material is used. It is designated commercially as P.V.C. plastisol. The approximate physical properties in relation to its use with these filter materials are as follows:
1. Weight - 10.7 pounds per gallon
2. Color - Black
3. Shore A durometer - 4
4. Brookfield Viscosity
   at 2 RPM 7000–12000 c.p.s.
   at 20 RPM 4000–7000 c.p.s.
5. Severs Viscosity
   at 80 psi less than 60 poises
6. Mold release - Excellent
7. Cure Temperature - 310 - 325° Internal
8. Wicking Into Filter Media - none to slight
9. Tensile Strength - 700 psi
10. Elongation - 250 percent Particulate and/or Gas Filtering System Equipment Installed in a Vehicle Following the preceding general data and design considerations, the conformable, compactable and expandable conical or conical-like filter cartridges have been installed in vehicles, as illustrated in FIGS. 1, 2, 3 and 6. In FIG. 1, a perspective view of a passenger car 30 indicates the cowling location 32 where the oncoming air pressure increases and the outside air enters a transverse intake opening 33 located across the base of the windshield 34, which directs the air into a plenum 36 under the cowl 32, wherein the filtering system equipment or assembly 38 is installed. In FIGS. 2 and 3, this overall filtering system installation is shown in greater detail. The incoming outside air enters the air intake 33 and thereafter is confined for further entry through a screened opening 39 on the left side of the car 40, as indicated by the flow arrows in FIG. 3. Thereafter in the plenum 36, the captured outside air moves transversely over a water dam 41 into the conformable conical-like compactable and expandable, preferably pleated, filter cartridge 42.

This filter cartridge 42 has been initially installed by removing an air screen from the right side of the plunum 36. During such initial installation, the water dam 41 has been placed in position and also the open cell foam rubber water drain plug 43 has been inserted in the right side rainwater drain passageway 44. After placement of the filter cartridge 42, the main cover plate 46 is secured in place with adhesive tape 48. Preferably, a removable by-pass rubber plug 50 is inserted in an opening 52 in this main cover plate 46. At the outset, the overall top enclosure is not completed, until after enlarging and adhering the filter cartridge 42 in place, using the securement adhesive tape 54 previously placed around its inner periphery during its manufacture. The adhesive 55 of which is not exposed completely until this final installation time, when a separable covering paper 56 is removed. After a final check, the inspection cover 58 is secured in place with adhesive tape 48 to complete the restructured right side of the plenum 36, so all captured incoming outside air must flow through the filter cartridge 42, so arranged in its overall filtering system equipment 38.

The filtered air thereafter flows to the fan 60 where it is pressurized and commences its distribution to the passenger compartment of the vehicle 30. Such distribution is optionally controlled by manipulating standard controls of the car 30, so the filtered incoming outside air passes directly into the compartment, passes into a heater, and/or passes into an air conditioner, the latter two accessories eventually when operating distributing the filtered and temperature controlled air to the passenger compartment of the vehicle 30.

When, after extended service for the duration of a designated service time period, or later under less severe conditions, or earlier under very severe conditions, the air filter cartridge 42 often requires inspection, and first, preferably only the inspection cover 58 needs to be removed. Then if some filter cleaning is in order it may be done using the opening cleared by the inspection cover 58. However, if a thorough cleaning is needed or the filter must be replaced, then the main cover plate 46 is also removed. Then the new conformable filter cartridge likewise is so conveniently first compacted, inserted, and then expanded into its effective filtering position, wherein it presents a large effective air entering filter surface area and results in a comparatively minimal pressure drop for such effective filtering. As occurred during the initial filter installation, the replacement filter cartridge 42 is conformed to vehicle plenum 36 using the access provided by initially leaving off hand access cover 58. By using one's fingers and hand, manipulating through the space, the air entry end of filter cartridge 42 is conformed and adherred to the plenum interior and cover plate 46.

Configurations of Various Filter Cartridges, per se, and Configurations and Other Filter Cartridge System Equipment Installed in Various Vehicles In FIG. 4, the filter cartridge 42 illustrated in FIGS. 2 and 3, is shown by itself to indicate how it might appear in a single cone configuration just before installation in a vehicle as shown in FIGS. 1, 2 and 3. At its open end its securement tape 54 or sealing tape 54 is shown already secured in part to the entry portions of the filter cartridge 42, preferably to its inner periphery. Somewhat midway of its flow axial length is a stiffening band 62 generally made of dead soft aluminum tape or made of wire encased in a plastic covering. Such stiffening bands conveniently undergo the compaction and the expansion of the conformable filter cartridge 42, yet when any configuration is wanted, these stiffening or conforming bands 62 help to maintain such selected configuration. At the central portion of a plenum 36 where filter cartridge 42 converges, it might be fully converged with its portions adhered together. Also, as shown in FIG. 4, a closed cell sponge rubber central portion 64 is used to which the converging filter materials 66 are secured with adhesives and/or adhesive tape 48. Moreover, the converging filter portions may be molded together preferably with a surrounding plastic such as P.V.C. plastisol. A better joint is assured and the nearby portions of the filter 42 are more effectively utilized when the spong rubber portion 64 is included or the filter portions are molded together.

Quite often in some vehicles, the axial flow length is restricted where an incoming air filter cartridge 42 is to be installed and a single cone configuration would be too long. For such shorter axial flow length installations, a multiple cone configuration is suitable, such as the incoming air filter 68. It also is made with stiffening bands 62 and a sponge rubber central portion 64. An adhesive tape 54 is used to seal these filter portions together and secure the filter cartridge 68 in place.

A filter cartridge 42, or a filter cartridge 68, may be installed, end for end, and still perform the filtering function equally well. So the placement of a filter cartridge 42 or 68 will be governed by the convenience of the location of the inspection cover 58 in reference to the filters eventual replacement and resealing.

As indicated in FIG. 6, a plenum chamber 36' may have a cross-section which is somewhat irregularly shaped. If so, a blocking structure called a facility plug 70 is formed to fit the irregular portion of the plenum 36' to block both air and water, yet leave sufficient room for the installation of an adequately sized filter cartridge 42, or another filter of different configuration such as filter cartridge 68. Generally, this facility plug 70 is made of closed cell sponge rubber and it may be held in position by a backing member 72, having integral braces 74 which in turn are held in place by adhesive tape 48 as illustrated in FIG. 6.

FIGS. 7, 8, 9, 10, 11 and 12 show selected filter cartridges 42, 68 and 76 and portions thereof in cross-section for their convenient comparison. In FIG. 7, filter cartridge 42 has the sealing and placement adhesive tape 54 located where it will be secured to the interior of a plenum 36 and the main cover plate 46. Reinforcement, stiffening or selectively deformable bands 62 are selectively used and spaced. A closed cell sponge rubber portion 64 is used where the filter material 66 converges as shown in FIG. 8. In FIGS. 9 and 11, filter cartridges 68 and 76 have outer and inner cone-like filter portions. In FIG. 10 the use of sealing adhesive tape 48 is shown for securing filter materials 66 together. In FIG. 10 adhesive tape portions 48 extend beyond filter materials 66 for their additional securement one to the other. In FIG. 12 molded heat cured P.V.C. plastisol 78 holds filter materials 66 together. In FIGS. 13, 14, 15, and 16, the use is illustrated of P.V.C. plastisol as a molding material to become end portion 78 of filter 76 and filter 80. A mold 82 is made with a cavity 84 of the desired end proportions and filled with P.V.C. plastisol material 78. Then filter materials 66 are compacted at one end and lowered into the P.V.C. plastisol material 78 and then the P.V.C. plastisol is heat cured in mold 82, to create the starting filter cartridge configuration 80 illustrated in FIG. 16. Throughout all embodiments of filter cartridges, sealing and placement adhesive tape 54 is preferably an adhesively backed foil tape 54, generally made of dead soft aluminum foil.

Figure 21:
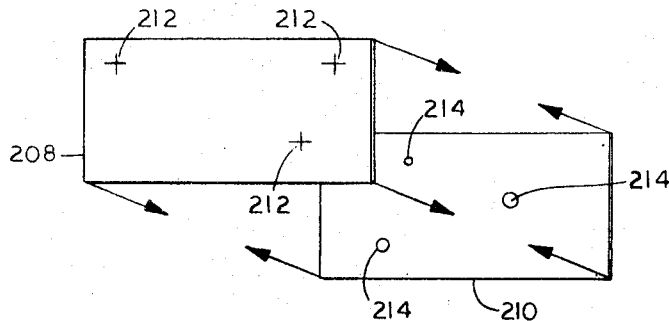
FIG. 21 illustrates two layers of filter material spaced apart and positioned to indicate how each have through passageways resulting from their production which might pass some incoming air without effectively filtering it if only one layer of filter material were to be used in the final filter, even though initially the one layer might be made twice as thick, hoping to avoid a through passageway; however, if the two thinner layers are used their random non woven laid fibers generally do not present aligned excessive size passageways denoted by the symbols + and o, and the composite layer filter cartridge to be assembled will be more effective within the same design size and pressure drop specifications.
Figure 22:
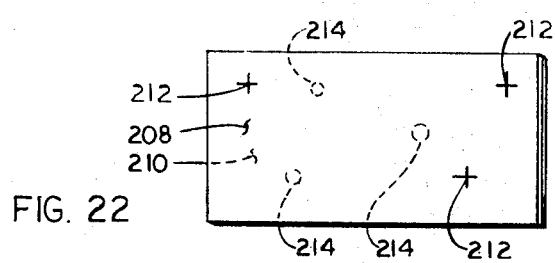
FIG. 22 shows the side by side assembled placement of the filter layers shown first in FIG. 21 indicating the intended mismatching or non alignment of the production passageways or holes of questionable or known oversize in the filter materials which might otherwise pass small quantities of incoming outside air without thoroughly filtering it, the excessive size passageways in the respective laminates or filter portions again being denoted by the symbols + and o.
Figure 23:
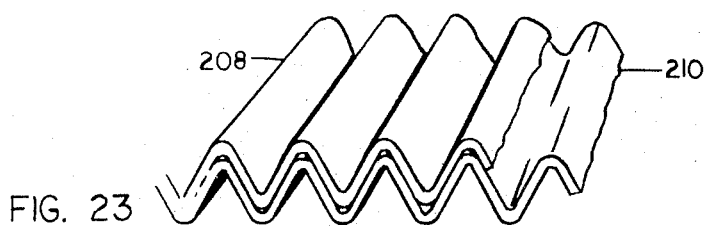
FIG. 23 illustrates the overlay of two pleated filter layers which substantially reduce any possibility of the alignment of two passageways or holes of questionable or known oversize diameters which might otherwise pass small quantities of incoming outside air without thoroughly filtering it, as indicated also in FIGS. 21 and 22.

Multiple Laminates of Layers of Filter Material Are Used to Reduce and/or Eliminate Passage of Outside Incoming Air Through Excessive Size Openings Unwantedly Resulting From Manufacturing Processes In installing the easily compacted and then easily expanded and conformed filters 42, 68, 76, the maximum exposed filter area is desired to operate within allowable pressure drops. Also the random laid fibers of the filter material 66 should be gathered sufficiently to assure the specified particle size filtering. However, in respect to one thickness of filter material, so selected, it is often noted the selected production filter materials 66, supplied commercially by others, often has random passageways through which oncoming outside air passes without being adequately filtered. Therefore, after a filter is selected for its pore size density and its thickness is decided upon which would be sufficient if no excessive size openings resulted from production runs, the filter is then composed of at least two sections, layers, or laminations of one half such thickness, as illustrated in FIGS. 21, 22 and 23.

Figure 18:
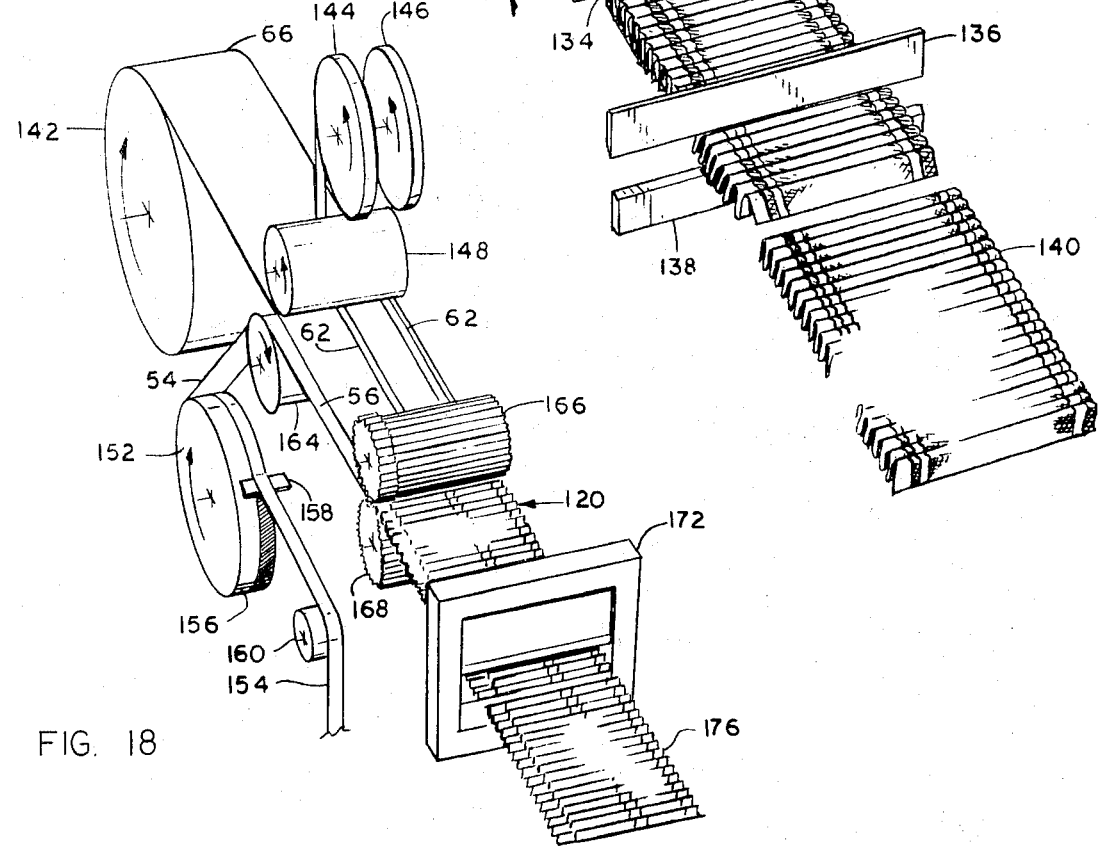
FIG. 18 is a partial perspective and schematic view indicating how particulate and/or gas filters of one layer are manufactured using many machine operations wherein a roll of the filter material, pre-selected with or without charcoal, in unrolled and moved on to additional rollers dispensing stiffening bands from above and an adhesive tape from below, and such composite materials are thereafter pleated and then cut to selected sizes, which are thereafter formed into various filter cartridge embodiments such as single and double cone filter cartridges shown in FIGS. 19 and 20.

Manufacturing Machinery and Manufacturing Methods for Producing the Conforming Filter Cartridges In FIGS. 17 and 18, manufacturing machinery and production sequences are schematically illustrated which are used to first arrange and then combine the starting components of these filter cartridges designed to clean outside incoming air enroute to interiors of vehicles 30 or buildings. In FIG. 17, to acquire the filtering benefits of two joined layers of filtering material 66, rolls 90 and 92 of filter material 66, optionally selected with or without charcoal, are rotatably mounted so the two layers 94, 96 may soon be joined after the selected row ejection of adhesives from spaced glue nozzles 98. Guide rollers 100 direct these layers 94, 96 through closely spaced rollers 102 which cause the adhesives to be effective in joining the layers 94, 96 together in the limited areas where additional components are to be added, thereby keeping the filtering areas at a maximum. For example, the added reinforcing formable dead soft aluminum strips 62 inclusive of adhesive are unrolled from supply rolls 106 above and are pressed against the top of the joined two layers 94, 96 of filter material 66 by using pressure rollers 108. From a roll 112 below, adhesive tape 54, having at least one adhesive cover strip 56, is secured from below to the edge portion of the combined layers 94, 96 of filter material 66, by using a pressure roller 108.

The powered pinch rollers 114 driven by a gear assembly 116 operated by using an electric motor 118, pull two layers 94, 96, of filter material, so joined and inclusive of aluminum strips 104 and adhesive tape 54, to insure complete feeding of all these components from their respective supply rolls. Upon discharge from these powered pinch rollers, assembled components of this filter material combination 120 travel by a dancer roller 122. Its vertical position is monitored to serve in creating a control signal to regulate the speed of electric motor 118 and consequently to regulate the oncoming supply of combined filter material combination 120 passing below dancer roller 122 and over guiding roller 124. In lieu of a dancer roller 122, the vertical position of traveling assembled components of filter material combination 120, may be monitored by photo electric 123 control equipment to create control signals to regulate the speed of electric motor 118.

Thereafter, the regulated supply of filter material combination 120 is pleated using a selected type of pleating mechanism. In FIG. 17, the oscillating assembly 126 of three pleat forming members is schematically illustrated. A horizontal oscillating pushing or packing member 128 advances filter material combination 120 toward an upper vertically oscillating holding member 130, as a lower pleat starting member 132 vertically oscillates to move filter material combination 120 upwardly between pushing or packing member 128 and holding member 130 to commence formation of a pleat 134. Pleat 134 is completed after the oscillating withdrawal of pleat starting member 132 and the near abutting oscillating movement of pushing or packing member 128 toward holding member 130. Holding member 130, after pleat 134 is formed, is moved upwardly, as indicated by directional arrows in FIG. 17, to thereby clear formed pleat 134 which is moving ahead utilizing its own resiliency, and then member 130 is lowered to be ready to help form another pleat 134.

After pleating, combined filter combination 120 is driven toward cutter bars 136, 138 which are adjustably moved toward one another at one of several optional locations to cut off pleated combined filter combinations 120 into selected lengths 140 suitable for making a particular size of a conical or conical like filter cartridge.

In FIG. 18 only one roll 142 of filter material 66 is used and it may preferably include charcoal. Soon after the filter material 66 is drawn from roll 142, dead soft aluminum stiffening bands or strips 62 are drawn from rollers 144, 146 and guided partially around upper positioning roller 148 for controlled adhesive contact with filter material 66. The adhesive is preferably applied earlier to the spaced stiffening bands 62. From below dual strip paper covered adhesively backed aluminum foil tape 54 is drawn from roll 152 after a portion 154 of its cover paper is removed leaving a portion 156 in place over the adhesive until the filter cartridge is installed. A plow 158 and a guide roller 160, are used during this removal of portion 154 of the overall cover paper. Also lower positioning roller 164 is utilized to guide the adhesively backed aluminum foil tape 54 into contact with the filter material 66 using its exposed adhesive to maintain its position along the edge of the filter material 66.

Following this combining of materials removed from the filtere material roll 142, stiffening band rolls 144, 146, and securement tape roll 152 powered pleating rollers 166 and 168 are operated to form the pleats common to the filter material 66, the stiffening bands 62, and securement tape 54. Thereafter, a cutoff machine 172 with a blade 174 is selectively sequenced to obtain pleated rectangular sections 176 of the combined filter components 120.

Figure 19:
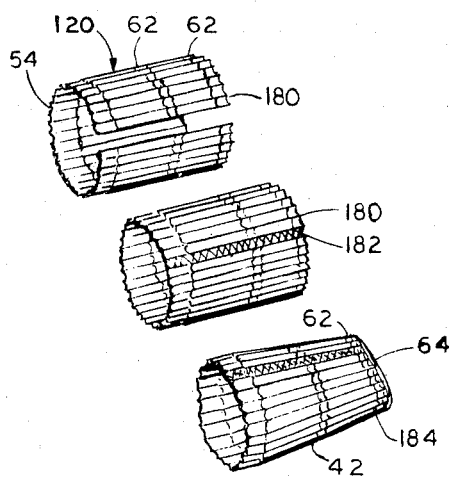
FIG. 19 is a composite perspective view to indicate how selected sizes of single or double layers of filter materials, with or without charcoal, are formed into a single cone filter cartridge.
Figure 20:
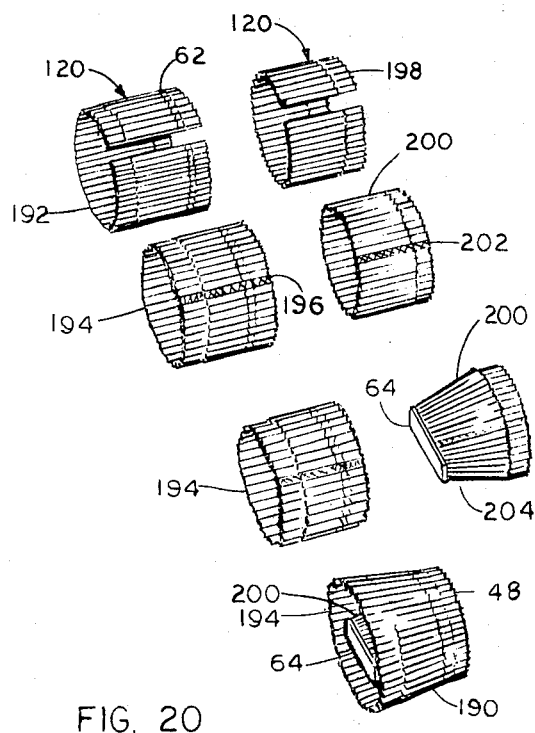
FIG. 20 is a composite perspective view to indicate how selected sizes of single or double layers of filters materials, with or without charcoal, are formed into a double cone filter cartridge.

Whether one or two layers of filter material are used, some of the following porduction steps are illustrated in FIGS. 19 and 20. The formation of a single cone filter cartridge 42 is shown in the composite FIG. 19. The rectangular starting filter portion or section 176 of combined filter components 120 is formed into a cylinder 180 and joined along a seam 182 utilizing adhesives. Then by selectively increasing the compactness of the pleating, each starting cylinder 180 is compressed at one end 184 into a conical shape. Thereafter, preferably instead of fully contacting these end pleats, an end portion 64 of closed cell sponge rubber is inserted and secured to the compressed filter end 184 using adhesives, or the heat cured P.V.C. plastisol end structure is used, thereby producing filter 42 having a single cone configuration.

If, however, a double cone filter configuration is wanted to fit installations where the axial flow length space in a plenum 36 is quite limited, somewhat wider, combined, continuous, pleated, filter materials are initially produced and formed into double cone filters 190 as illustrated in FIG. 20. One portion 192 of wider combined filter material components 120 is formed into a cylinder 194 and secured by adhesives along a seam 196. Another narrower portion 198 of combined filter material components 120, is formed into a cylinder 200 and also secured by adhesives along a seam 202. The narrower or smaller cylinder 200 is then formed to become the inside fiter cone as its end portion 204 is compressed using the pleats and is then adhesively secured to an end insert portion 64 of closed cell sponge rubber or a heat cured plastisol structure is used. Thereafter, the wider or larger portion 194 is fitted over the smaller cone portion 200 and formed into an outer filter cone portion. Subsequently, the two cones 194 and 200, along a common portion, are secured together, using adhesive tape 48 or P.V.C. plastisol material to form a multiple or double cone filter 190.

Throughout these manufacturing porcesses for making single cone or double cone filter cartridges, preferably there will be steps taken to insure that oversize filter openings are avoided. As indicated in FIG. 21, two different portions 208, 210 generally have oversize holes, such as holes 212 in portion 208, and holes 214 in portion 210, located at random places. Therefore, if two layers of filter material 66 are used together, such as portions 208 and 210 secured to one another as shown in FIG. 22, no oversize through holes are to be observed. As a consequence, the overlay and securing of pleated filter materials 66, as illustrated in FIG. 23, is generally successfully undertaken to avoid oversize through holes. To insure such success in filtering, in any filter cartridge so fabricated, the two layers must be adhesively secured together at their edges and limited places in between, generally at the locations of stiffeners and edge adhesive tapes. The layers will then fit against one another, thereby preventing incoming air passing through an oversize hole in one layer and then moving between layers until another oversize hole is found in the other layer through which the air passes without being adequately filtered.

Figure 24:
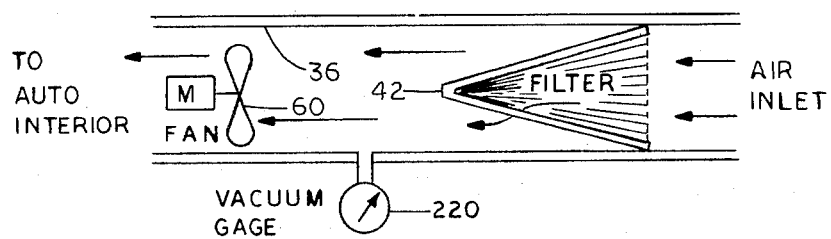
FIG. 24 is a cross sectional schematic partial view of a plenum on a vehicle indicating the placement of a vacuum gage, beyond the filter cartridge and ahead of the fan delivering the filtered incoming outside air to the interior of an automobile, to sense and to indicate the lack of sufficient air flow through the filter cartridge and on into the vehicle interior.
Figure 25:
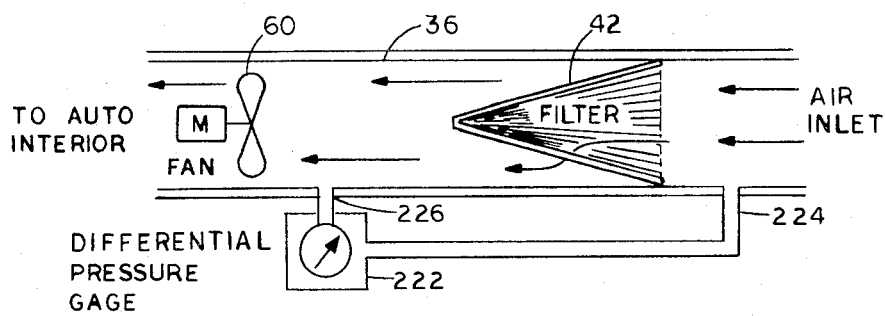
FIG. 25 is a cross sectional schematic partial view of a plenum on a vehicle indicating the placement of a differential pressure gage, with respect to a filter cartridge and a fan delivering the filtered incoming outside air to the interior of an automobile, to sense and to indicate the lack of sufficient air flow through the filter cartridge and on into the vehicle interior.

Monitoring of Filter Performance Using Sensing Equipment, and By Passing Filters, if Necessary, Sometimes Using Automatic Controls Once in operation, the filter cartridges should serve well for an unexpected time period. However, for handling the unexpected situations of icing, soaking with water, and/or overloading with sand particles in severe dust storms, a pressure drop sensor such as the vacuum gage 220, as illustrated in FIG. 24, is optionally installed. Its instrument dial is located in the vehicle where it will be readily observed so the operator will know the filter cartridge is becoming clogged or is clogged and the pressure has consequently dropped in the plenum 36 between the filter cartridge 42 and the fan 60. As illustrated in FIG. 25, if the filter cartridge 42 is becoming clogged or is clogged, this information will be observed as the vehicle operator reads the differential pressure gage 222 which is sensing the air pressure before and after the filter 42 at the respective ports 224 and 226. If the clogging becomes excessive, the operator will stop the vehicle 30 and remove the by pass plug 50, which is shown in FIGS. 2 and 3.

Figure 26:
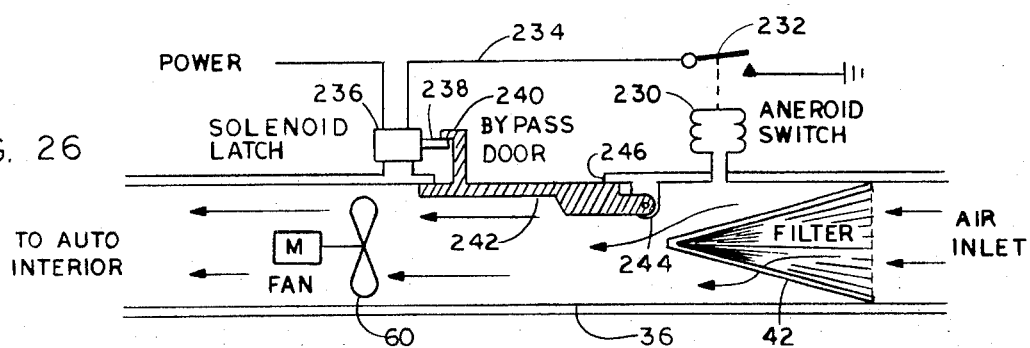
FIG. 26 is a cross sectional schematic partial view of a plenum on a vehicle indicating the placement of a subassembly to automatically sense a restricted flow of incoming outside air through the filter cartridge and then to open a by pass to acquire sufficient air flow into the automobile interior until the filter cartridge may be serviced and/or replaced; the subassembly comprising an aneroid pressure switch, a by pass door retained in a closed position by a solenoid operated latch which is operated to open the by pass door when electrical power is present in a circuit closed upon operation of the aneroid pressure switch.

However, as indicated in FIG. 26, fully automatic equipment is installed so the by pass will open while the vehicle 30 is underway. An aneroid or bellows 230 operated switch 232, positioned in the plenum 36 beyond the filter cartridge 42, senses the pressure drop caused by the clogging of the filter cartridge 42. When it becomes critical, the switch 232 moves to close circuit 234. The electrical energy in this circuit 234 then operates solenoid latch 236 which retracts its plunger 238 clear of the shouldered structure 240 of the by pass door 242. This door 242 then pivots about its mounting 244, dropping into the plenum 36 to clear the by pass opening 246, through which incoming outside air flows in beyond the filter cartridge 42 to be distributed into the vehicle 30, after passing by fan 60.

Filter Cartridges and Filtering Systems in Buildings

Figure 27:
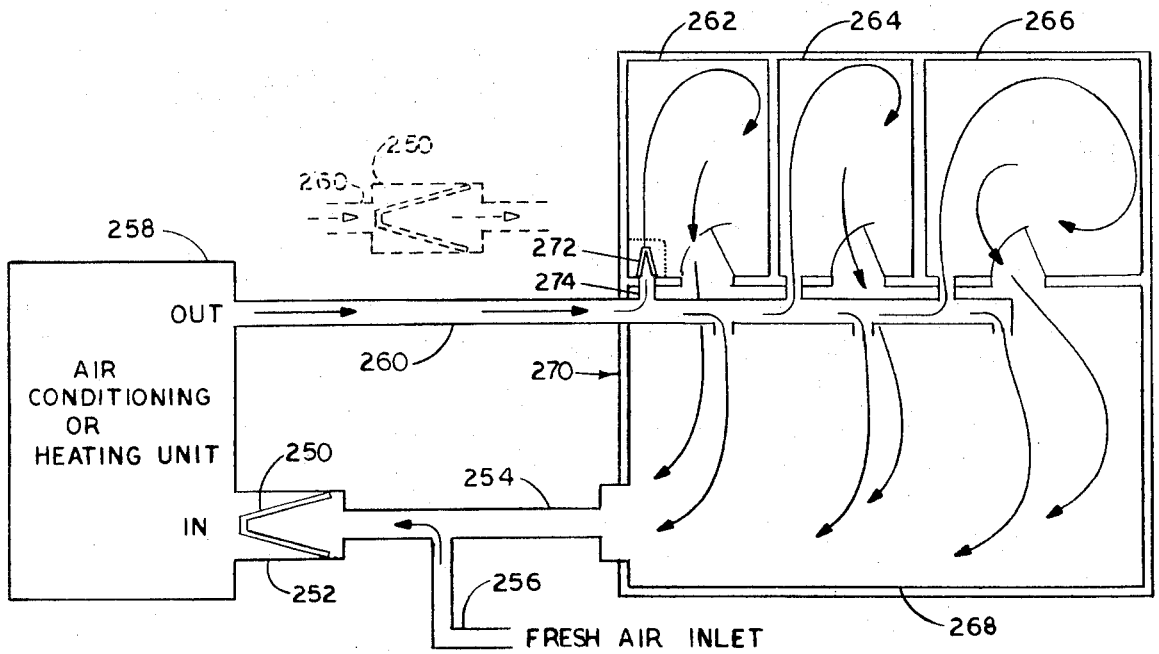
FIG. 27, is a horizontal cross sectonal schematic view of a building and its air conditioning and/or heating unit and the associated ducts or passageways leading to and from the various rooms of the building, indicating the placement of one filter cartridge in the combined return air and fresh air inlet duct, and indicating by dotted lines, the optional placement of a second filter cartridge in the outgoing air conditioning or heating unit duct directing air into the rooms of the building.

As illustrated schematically in FIG. 27, a larger filter cartridge 250 is installed in the air duct 252 bringing both the return air back from its duct 254 and fresh air in from its duct 256 to a principal air conditioning and/or heating unit 258. After such processing the leaving filtered and conditioned air is distributed first through duct 260 and then into respective rooms 262, 264, 266, 268 of building 270. Optionally, as indicated by the dotted lines set apart in FIG. 27, another filter cartridge 250 might be installed in the distribution duct 260. Also, smaller filter cartridges 272, may be installed in the duct 274 leading into a particular room 262 to further enhance the purity of the air being supplied to a critical space. Such a space might be a room used for testing instruments, or assembling small electronic components in an industrial building, or an intensive care room of a hospital or a specialized care room of a nursing home.

The Present Incoming Outside Air Filtering System for Vehicles And Its Possible Future Modifications As time goes on and vehicle designs change, and as these filter cartridges illustrated and described herein become better known, it is anticipated that fewer components of the overall filter system equipment may be needed. For example, irregular cross-sectioned plenums may not be so designed and then the blocking structures or facililty plugs 70 will not be needed. Also the handling of rain water coming in through the air intake may be undertaken differently and the water dam 44 and air plugs 43 in the drains will not be needed. However, now in many installations these components of the overall filtering system equipment are in part or all are required to make an effective installation, centering on the conical or conical-like configurations of the conformable pleated filter cartridges which are so readily compacted and expanded. Each filter cartridge is; so readily compacted for entry and then easily expanded for fitting within a passenger air plenum of a vehicle to present a maximum area filtering cartridge operable within a reasonable pressure drop range, for a convenient operating period before inspection, cleaning and/or replacement, that only about three basic sizes need to be produced and stocked. Yet even this number might be reduced.

The filters, in cartridge form, may be considered expendable for their production is at low cost. However design changes might make is possible to clean them more conveniently prolonging their useful life. The schematic FIGS. 17 and 18, indicated the manufacturing equipment and methods and these may be subject to further mechanization and modification leading to future higher production runs resulting in lower unit costs of the filter cartridges. Routine vehicle checkups will include an inspection of the filter cartridge and as necessary, a replacement will be made of the passenger air filter cartridge, often along with the inspection and possible replacement of the engine air filter and possibly also the oil filter.

SUMMARY OF ADVANTAGES

Through the comparatively low cost manufacture and convenient installation of the conformable filter cartridges which are so compactable and expandable, particulate and/or gas filtering system equipment is made universally available to all persons who must ride in vehicle compartments and/or live in buildings where filtering of incoming outside air is necessary not only to make one's life more pleasant but also may be necessary to maintain one's health. When all pollutants, inclusive of particulates and harmful gasses, must be removed and/or modified, and yet the cross-sectional area of a duct or plenum is quite small, the compactable and expandable pleated conical or conical-like filter cartridges of single and multiple cone arrangements, generally of at least two layers, are especially conformable in such installations to become very valuable in accomplishing the filtering during the operation of the overall system. The filter cartridges are so conformable to fit the many odd sizes and shapes of plenums and ducts that only a very few sizes need to be manufactured and stocked. Moreover, the filter cartridges and their associated filtering system and equipment thereof, is universally applicable and adaptable to vehicle systems and to building systems handling incoming outside air supplies. No extensive special alterations need to be made of original construction members of such vehicles or buildings, and often no alterations need to be undertaken. Moreover, the conformable filter cartridges serve their valuable purpose of incoming outside air fitering without causing excessive pressure drops, without requiring too frequent inspections, cleanings and/or replacements, and without incurring unreasonable initial and/or operating costs.

We claim:

1. For installation in fluid filtering equipment, a fluid filter cartridge comprising at least two layers of filter materials each of said layers including random multiple through passageways of non-uniform, varying diameters, in consequential portion of said passageways being oversized with respect to the predetermined porosity of said filter material, said two layers being juxtaposed and retained in a fixed, face-to-face relationship, so that the air to be purified passes directly through both of said layers in substantially undeviating fashion and whereby there is no substantial alignment of said oversized passageways in the filter materials through which fluid might pass without being sufficiently filtered.

2. For installation in fluid filtering equipment, a fluid filter cartridge, as claimed in claim 1, comprising, in addition, adhesive means to secure the fluid filter cartridge in place without requiring other fastening means which might otherwise decrease the cross-sectional fluid flow area of any structure in which the fluid filtering equipment is installed.

3. For installation in particulate and/or gas filtering eqiupment to purify air to be breathed by persons in vehicles and/or buildings, a filter cartridge, comprising two layers of filter materials each of said layers including random multiple through passageways of non-uniform, varying diameters, a consequential portion of said passageways being oversized with respect to the predetermined porosity of said filter material, said two layers being juxtaposed and retained in a fixed, face-to-face relationship, so that the air to be purified passes directly through both of said layers in substantially undeviating fashion and whereby there is no substantial alignment of said oversized passageways in the filter materials through which incoming outside air might pass without being sufficiently filtered.

4. A fluid filter cartridge to filter incoming fluids, which is insertable into a fluid passageway of uninterrupted cross-sectional area and thereafter is expandable to conform, at least in one location, with the entire uninterrupted cross-sectional area of this fluid passageway, comprising, a fluid filtering body comprising two layers of filter materials each of said layers, including passageways of non-uniform, random multiple through varying diameters, a consequential portion of said passageways being oversized with respect to the predetermined porosity of said filter material, said two layers being juxtaposed and retained in a fixed, face-to-face relationship, so that the air to be purified passed directly through both of said layers in substantially undeviating fashion and whereby there is no substantial alignment of said oversized passageways in the filter materials through which incoming fluids might pass without being sufficiently filtered, said fluid filtering body further having multiple folds substantially throughout the filtering body which are useful during the insertion and expansion of the fluid filter into fluid passageways of many shapes of uninterrupted cross-sectional area.

5. A fluid filter cartridge, as claimed in claim 1, having stiffening means secured on the fluid filtering body and folded to match its multiple folds.

6. A fluid filter cartridge, as claimed in claim 1, having a fastening means secured in part to the fluid filtering body portion and folded to match its multiple folds and arranged so its other part is securable to the entire cross-sectional area of an incoming fluid passageway.

7. A fluid filter cartridge, as claimed in claim 1, having stiffening means on the fluid filtering body folded to match its multiple folds, and having a fastening means secured in part to the fluid filtering body and folded to match its multiple folds, and arranged so its other part is securable to the entire cross-sectional area of an incoming fluid passageway.

8. A fluid filter cartridge, as claimed in claim 1, wherein the fluid filtering body having multiple folds presents a filtering surface area to the oncoming fluids which is much greater than the cross-sectional area of the fluid passageway, as the folded portions are positioned throughout a length of the fluid passageway.

9. A fluid filter cartridge, as claimed in claim 2, wherein the fluid filtering body having multiple folds is arranged as a pleated conical fluid filtering body.

10. A fluid filter cartridge, as claimed in claim 9, wherein the pleated conical fluid filtering body has, in addition, deformable stiffening means pleated to match in part the pleats of the conical fluid filtering body.

11. A fluid filter cartridge, as claimed in claim 9, wherein the pleated conical fluid filtering body has, in addition, a fastening means secured in part to an end of the fluid filtering body and pleated to match its multiple pleats and arranged so its other part is securable to the entire cross-sectional area of a fluid passageway.

12. A fluid filter cartridge, as claimed in claim 9, wherein the pleated conical fluid filtering body has, in addition, deformable stiffening means pleated to match in part the pleats of the conical fluid filtering body, and also has a fastening means secured in part to an end of the pleated conical fluid filtering body to match its multiple pleats and be arranged so its other part is securable to an entire cross-sectional area of a fluid passageway.

13. A fluid filter cartridge, as claimed in claim 1, wherein the fluid filtering body is composed of random laid fibers.

14. A fluid filter cartridge, as claimed in claim 13, wherein the fluid filtering body is composed of random fibers, such as fibers of hemp, and synthetic and inorganic fibers.

15. A fluid filter cartridge, as claimed in claim 13, wherein the random laid fibers of the fluid filtering body also include activated carbon.

16. A fluid filter cartridge, as claimed in claim 15, wherein the activated carbon is bonded to the random laid fibers.

17. Particulate and/or gas filtering equipment to purify air to be breathed by persons in vehicles, comprising:

a. a substantially, uniformly throughout, conformable, compactable, and expandable filter cartridge having a greater surface area than the uninterrupted cross-sectional area of a vehicle plenum into which it is to be expandably placed, after first being inserted through a restrictive size opening which initially generally requires its compaction, and b. accessory structures, as required, to block water from entering the filter cartridge, and to block any possible bypass opening through which incoming outside air might pass without passing through the conformable, compactable and expandable filter cartridge enroute to a vehicle compartment occupied by passengers.

18. Particulate and/or gas filtering equipment, as claimed in claim 17, wherein the conformable, compactable and expandable filter cartridge is composed of an activated carbon bonded to random laid fibers.

19. Particulate and/or gas filtering equipment, as claimed in claim 17, wherein the conformable, compactable, and expandable filter cartridge is reformably stiffened by spaced dead soft aluminum tape applied with adhesive and conformed to the surface of the filter.

20. Particulate and/or gas filtering equipment, as claimed in claim 17, wherein the conformable, compactable and expandable filter cartridge is completely secured in place in the plenum at a designated cross-sectional location be using an adhesive tape secured in part to the filter and in part to the plenum structure of the vehicle and, as necessary, to accessory structures used to block air which otherwise would not pass through the filter.

21. Particulate and/or gas filtering equipment, as claimed in claim 17, wherein the conformable, compactable and expandable filter cartridge is composed of at least two layers which are arranged so any possible holes larger than proper filtering size holes resulting from high production tolerances in the respective layers are not in alignment, thereby insuring, to a greater degree, air passing through the overall filter will be thoroughly filtered.

22. Particulate and/or gas filtering equipment, as claimed in claim 17, wherein the filter cartridge is formed in a conical shape and pleated substantially throughout its filtering area.

* * * * *